No. 855,042.
PATENTED MAY 28, 1907.
A. CATTLIN.
ROLLING PIN.
APPLICATION FILED DEC. 29, 1906.
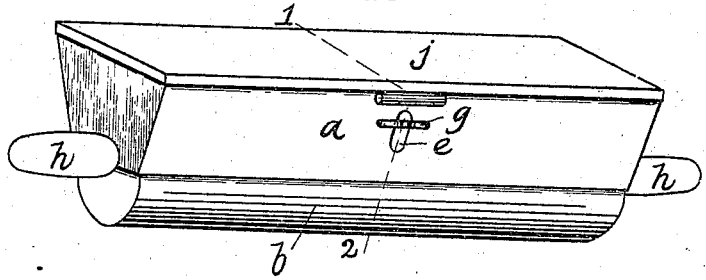
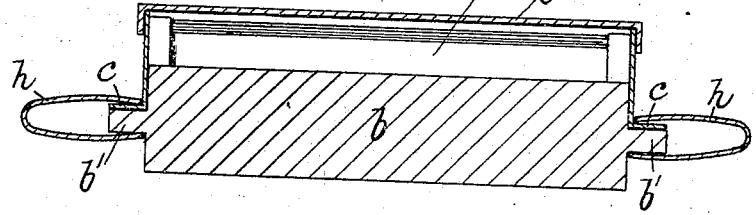
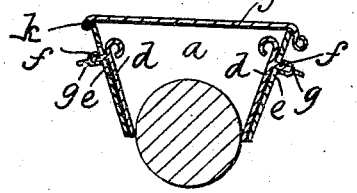
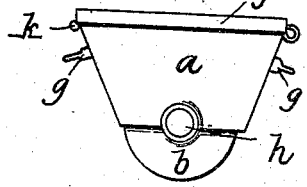
WITNESSES:
A. H. Berrigan
F. H. Logan
INVENTOR,
ALFRED CATTLIN,
BY
Attorney.

UNITED STATES PATENT OFFICE.

ALFRED CATTLIN, OF AKARAO, NEW ZEALAND.

ROLLING-PIN.

No. 855,042.     Specification of Letters Patent.     Patented May 28, 1907.

Application filed December 29, 1906. Serial No. 349,956.

*To all whom it may concern:*

Be it known that I, ALFRED CATTLIN, dental surgeon, a subject of the King of Great Britain, residing at Akarao, New Zealand, have invented a new and useful Improvement in and Relating to Rolling-Pins; and I do hereby declare the following to be a full, clear, and exact description of the same.

This invention relates to the rolling pins that are used in the preparation of dough for cooking, and especially to an attachment to an ordinary rolling pin by the use of which the surface of the pin will be kept clear of dough when in use and thus kept in a clean condition ready for use.

The attachment designed consists of a hopper adapted to hold flour, that is fitted longitudinally upon the rolling pin in such a manner as to envelop the upper portion of its periphery and to be kept in such a position during the use of the pin. To the inside face of this hopper plates are secured in such a manner that their bottom edges will be capable of adjustment with regard to their distance from the pin's periphery and also from the bottom openings in the hopper along each edge. These plates will thus serve to regulate the width of the openings between the bottom of the hopper and the pin, so as to regulate the flow of flour, and may be adjusted to bear upon the periphery of the pin and thereby serve to scrape off any matter adhering thereto when in use.

In the accompanying drawings:—Figure 1 shows my invention in elevation. Fig. 2 is a longitudinal sectional elevation of the rolling pin and attachment. Fig. 3 is a cross section along the line 1—2 Fig. 1. and Fig. 4 is an end elevation of the pin and attachment.

$a$ is the hopper which is adapted to fit over and upon the pin $b$ by means of caps $c$ that are adapted to rest upon the pin's handles $b'$. These handles $b'$ are constructed preferably short as shown in the drawings.

The attachment may be constructed of any suitable material such as tin or the like, and the shape of the hopper may be varied if preferred.

Secured to the inside of the hopper $a$ are plates $d$ that are so disposed and arranged as to be capable of movement in a vertical plane within the hopper. The pin is adapted to revolve within the hopper, and the openings between the sides of the hopper and the pin's periphery are regulated by such plates. To enable the plates to be moved or operated from the outside of the hopper a slotted aperture $e$ is formed in each side of the hopper (Fig. 1) through which a bolt $f$, which is attached to the corresponding plate extends. By means of this construction the bolts $f$ may be moved up or down in a vertical plane at the will of the operator. The outer ends of the bolts are threaded in order to receive thumb nuts $g$ which bear against the respective outer faces of the hopper and give the plates the desired tension. The hopper is securely attached to the rolling pin by means of outer handles $h$ that are adapted to envelop the aforesaid stump handles and caps $c$ and hold the parts firmly together, at the same time serving as bearings in which the rolling pin will be supported and will revolve when rolled over the desired surface. Any suitable means can be provided for keying the handles $h$ to the hopper and at present it is thought a pin constructed upon the outer ends of the hopper engaging with small holes arranged in the ends of the handles would answer this purpose. The hopper is provided with a lid $j$ that is hinged at $k$ and is adapted to fit down upon the hopper as shown in Fig. 1.

When in operation the hopper is filled with flour which is caused to drop down between the sides of the hopper and the pin, according to the direction in which the pin is rotating. The widths of the openings are regulated by the plates aforesaid. If it is thought necessary a brush or the like may be arranged within the hopper extending longitudinally therein in such a way that when the pin is rotating the brush will likewise be set in motion and act as a stirrer for feeding the flour to the pin. As before mentioned the said plates may be adjusted so as to bear against the pin's periphery and act as scrapers for keeping the pin free from dough.

Having now described my invention, what I claim as new and desire to secure by Letters Patent is:—

1. In rolling pins, the combination with the pin of a hopper secured upon and extending longitudinally along it and having an open bottom enveloping the upper portion of the pin's periphery, a vertical slot in each side of the hopper a plate against the inside face of each side of the hopper, a threaded pin secured to such plate and passing through the corresponding slot in the hopper's side and a thumb nut screwed upon such pin, substantially as specified.

2. In rolling pins, the combination with the pin of a hopper extending longitudinally along it and the open bottom of which envelops the upper portion of the pin's periphery, such hopper being provided with vertically adjustable plates secured upon the inner surfaces of its sides and having handles on each of the two ends of the hopper fitting upon and enveloping the handles of the pin substantially as specified.

In testimony whereof I have signed this specification in the presence of two subscribing witnesses.

ALFRED CATTLIN.

Witnesses:
  PERCY RICHMOND CLIMIE,
  FLORENCE ANNIE ALDERSLEY.